(12) United States Patent
Ramamoorthi et al.

(10) Patent No.: US 11,216,296 B2
(45) Date of Patent: Jan. 4, 2022

(54) IDENTIFYING A LEAST COST CLOUD NETWORK FOR DEPLOYING A VIRTUAL MACHINE INSTANCE

(71) Applicant: Hewlett Packard Enterprise Development LP, Houston, TX (US)

(72) Inventors: Balaji Ramamoorthi, Bangalore Karnataka (IN); Siva Subramaniam Manickam, Bangalore Karnataka (IN); Vinnarasu Ganesan, Bangalore Karnataka (IN); Thavamaniraja Sakthivel, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 173 days.

(21) Appl. No.: 16/387,490

(22) Filed: Apr. 17, 2019

(65) Prior Publication Data

US 2020/0334059 A1    Oct. 22, 2020

(51) Int. Cl.
  *G06F 9/455*    (2018.01)
(52) U.S. Cl.
  CPC .. *G06F 9/45558* (2013.01); *G06F 2009/4557* (2013.01); *G06F 2009/45595* (2013.01)
(58) Field of Classification Search
  None
  See application file for complete search history.

(56) References Cited

U.S. PATENT DOCUMENTS

| | | | |
|---|---|---|---|
| 9,686,154 B2 * | 6/2017 | Amendjian | ......... H04L 41/5058 |
| 9,716,634 B2 | 7/2017 | Sapuram et al. | |
| 9,800,477 B2 | 10/2017 | Burton et al. | |
| 9,858,068 B2 * | 1/2018 | Gibson | ............... G06F 9/45533 |
| 10,120,668 B2 * | 11/2018 | Palavalli | ............. G06F 9/44578 |
| 10,387,181 B2 * | 8/2019 | Cao | ...................... G06F 11/3051 |
| 10,489,214 B2 * | 11/2019 | Joseph | ................ H04L 41/5041 |
| 10,498,664 B2 * | 12/2019 | Hodique | ............ G06Q 30/0206 |
| 2011/0270968 A1 | 11/2011 | Salsburg et al. | |
| 2012/0137003 A1 | 5/2012 | Ferris et al. | |
| 2012/0304179 A1 | 11/2012 | Devarakonda et al. | |
| 2016/0125489 A1 | 5/2016 | Gupte et al. | |

(Continued)

OTHER PUBLICATIONS

Chieu et al. "Simplifying solution deployment on a Cloud through composite appliances", 2010 IEEE, 5 pages.*

(Continued)

*Primary Examiner* — Van H Nguyen
(74) *Attorney, Agent, or Firm* — Jaffery Watson Mendonsa & Hamilton (57) ABSTRACT

Virtual machine images available across a plurality of cloud networks may be identified. A catalog of the virtual machine images may be generated. The catalog may comprise, for each virtual machine image, a mapping information, comprising: a name of a virtual machine image, a name of a virtual machine instance based on the virtual machine image, a name of a cloud network providing the virtual machine image, a cost of deploying the virtual machine instance on the cloud network, a tag identifying a feature of the virtual machine image, and an identification tag assigned to the virtual machine image. For a given virtual machine instance, the catalog of the virtual machine images may be analyzed to identify a least cost cloud network.

20 Claims, 7 Drawing Sheets

(56) References Cited

U.S. PATENT DOCUMENTS

2016/0380906 A1* 12/2016 Hodique ............ G06Q 30/0206
709/226
2017/0199752 A1* 7/2017 Cao .................... G06F 9/45558

OTHER PUBLICATIONS

Alfonso et al. "Infrastructure deployment over the Cloud", 2011 IEEE, pp. 517-521.*
Chen et al. "Mechanism of Automatic Deployment for Virtual Network Environment", 2013 IEEE, pp. 1061-1066.*
Cisco; "The Need for Service Catalog Design in Cloud Services Development"; May 27, 2011; 12 pages.
Cloud Cruiser, "Cloud Financial Management", Datasheet, May 2013, 2 pages.
Flexera, "RightScale Optima", Datasheet, Nov. 2018, 4 pages.
Nutanix, "Nutanix Beam: Multi-Cloud Management and Optimization", Jul. 2018, 2 pages.
Rightscale, "RightScale Cloud Management Platform", Sep. 2018, 6 pages.

* cited by examiner

| Cloud Network | Virtual machine instance |
|---|---|
| Cloud Network 104 | Virtual machine instance 1 |
| | Virtual machine instance 2 |
| | Virtual machine instance 3 |
| Cloud Network 106 | Virtual machine instance 4 |
| | Virtual machine instance 5 |
| | Virtual machine instance 6 |
| Cloud Network 108 | Virtual machine instance 7 |
| | Virtual machine instance 8 |
| | Virtual machine instance 9 |
| | Virtual machine instance 10 |

FIG. 2

| Cloud Network | Virtual machine instances | Virtual machine image |
|---|---|---|
| Cloud Network 104 | Virtual machine instance 1 | Ubuntu 16.04 |
| | Virtual machine instance 2 | Ubuntu |
| | Virtual machine instance 3 | RHEL |
| Cloud Network 106 | Virtual machine instance 4 | Ubuntu-16.04 |
| | Virtual machine instance 5 | Windows-2012 |
| | Virtual machine instance 6 | RHEL7-base |
| Cloud Network 108 | Virtual machine instance 7 | Ubuntu-16-04-server |
| | Virtual machine instance 8 | RHEL7-x64 |
| | Virtual machine instance 9 | RHEL7-x64 |
| | Virtual machine instance 10 | Centos-7.3-template |

FIG. 3

| Cloud Network | Virtual machine images | Feature tag : Feature | Identification tag |
|---|---|---|---|
| Cloud Network 104 | Ubuntu 16.04 | OS : Ubuntu<br>Version : 16.04<br>Architecture : x64<br>Config : Base | Ubuntu_16.04_x64_Base |
| | Centos_cloudinit | OS : CentOS<br>Version : 7<br>Architecture : x86<br>Config : Base | CentOS_7_x86_Base |
| | Ubuntu | OS : Ubuntu<br>Version : 16.04<br>Architecture : x64<br>Config : MongoDB | Ubuntu_16.04_x64_MongoDB |
| | RHEL | OS : RHEL<br>Version : 7<br>Architecture : x64<br>Config : Base | RHEL_7_x64_Base |
| Cloud network 106 | Ubuntu-16.04 | OS : Ubuntu<br>Version : 16.04<br>Architecture : x64<br>Config : MongoDB | Ubuntu_16.04_x64_MongoDB |
| | Windows-2012 | OS : Windows<br>Version : 2012<br>Architecture : x64<br>Config : Base | Windows_2012_x64_Base |
| | RHEL7-base | OS : RHEL<br>Version : 7<br>Architecture : x64<br>Config : Base | RHEL_7_x64_Base |
| Cloud network 108 | Ubuntu-16.04-server | OS : Ubuntu<br>Version : 16.04<br>Architecture : x64<br>Config : base | Ubuntu_16.04_x64_Base |
| | Centos-7.3-template | OS : CentOS<br>Version : 7<br>Architecture : x64<br>Config : Base | CentOS_7_x64_Base |
| | Windows-2012-server | OS : Windows<br>Version : 2012<br>Architecture : x64<br>Config :<br>Meanstack | Windows_2012_x64_Base |
| | RHEL7-x64 | OS : RHEL<br>Version : 7<br>Architecture : x64<br>Config : Base | RHEL_7_x64_Base |

FIG. 4

| Identification tag | VM image | VM instance | Cost/Hour | Cloud network (CN) |
|---|---|---|---|---|
| Ubuntu_16.04_x64_Base | Ubuntu 16.04 Ubuntu16.04 Ubuntu-16-04-server | Deployment1 Deployment7 | 1$ 0.125$ | CN 104 CN 106 CN 108 |
| Ubuntu_16.04_x64_MongoDB | Ubuntu Ubuntu-16.04 | Deployment2 Deployment4 | 1$ 2$ | CN 104 CN 106 |
| Windows_2012_x64_Meanstack | Windows Windows 2012-server | | | CN 104 CN 108 |
| Windows_2012_x64_Base | Windows 2012 Windows 2012 | Deployment5 | 2$ | CN 104 CN 106 |
| RHEL_7_x64_Base | RHEL RHEL7-base RHEL-x64 | Deployment3 Deployment6 Deployment8 Deployment9 | 1$ 2$ 0.125$ 0.125$ | CN 104 CN 106 CN 108 |
| CentOS_7_x64_Base | Centos-7.3-template | Deployment10 | 0.125$ | CN 108 |
| Ubuntu_7_x64_Base | Ubuntu-template | | | CN 108 |
| Windows_2016_x86_Base | Windows-2016 | | | CN 106 |

IDENTIFYING A LEAST COST CLOUD NETWORK FOR DEPLOYING A VIRTUAL MACHINE INSTANCE

BACKGROUND

The advent of cloud-based computing architectures has opened new possibilities for businesses. As a result, an increasing number of enterprises are adopting cloud computing based solutions. Generally speaking, cloud computing involves delivery of computing as a service rather than a product, whereby shared resources (software, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, examples will now be described, with reference to the accompanying drawings, in which.

DETAILED DESCRIPTION

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service".

One of the reasons behind the success of cloud computing is a technology called virtualization. Virtualization allows creation of a virtual version of a resource such as an operating system, a hardware platform, a storage resource etc. which may be shared, for instance, among different clients. Multiple virtual machines (VMs) may be created on a host device (for example, a server).

As used herein, the term "cloud network" (or "cloud") may include a public cloud, a private cloud, or a hybrid cloud. To explain briefly, a cloud may be termed as a public cloud if cloud computing services are rendered over a public network such as the internet. On the other hand, a private cloud is a proprietary network that supplies services to a specific set of users. A hybrid cloud combines private and public cloud services.

In case of a hybrid cloud environment (or an environment with multiple public cloud providers), if a user creates a new virtual machine instance based on a virtual machine image on a public cloud provider, the user may be unaware that the same virtual machine image may be present on a different cloud provider at a lower cost. This may lead to increase operational costs. Further, if a user wants to on board a new cloud network (or cloud network provider) to a cloud management platform, there is no option to analyze virtual machine images present across various cloud providers and provide a cost analysis for migrating an existing workload to another cloud provider. It's not a desirable scenario from an enterprise's perspective.

To address these technical challenges, the present disclosure describes various examples for identifying a least cost cloud network for deploying a virtual machine instance. In an example, virtual machine images available across a plurality of cloud networks may be identified. In response to the identification, a catalog of the virtual machine images may be generated. In an example, the catalog may comprise, for each virtual machine image, a mapping information. In an example, the mapping information may comprise: a name of a virtual machine image, a name of a virtual machine instance based on the virtual machine image, a name of a cloud network providing the virtual machine image, a cost of deploying the virtual machine instance on the cloud network, a feature tag identifying a feature of the virtual machine image, and an identification tag assigned to the virtual machine image. Then, for a given virtual machine instance, the catalog of the virtual machine images may be analyzed to identify a least cost cloud network that provides a least cost of deploying the virtual machine instance based on a virtual machine image available thereon.

The proposed solution may reduce operational costs by analyzing a catalog of images present across multiple cloud providers, and identifying a least cost cloud platform for deploying a virtual machine instance.

Figure 1:
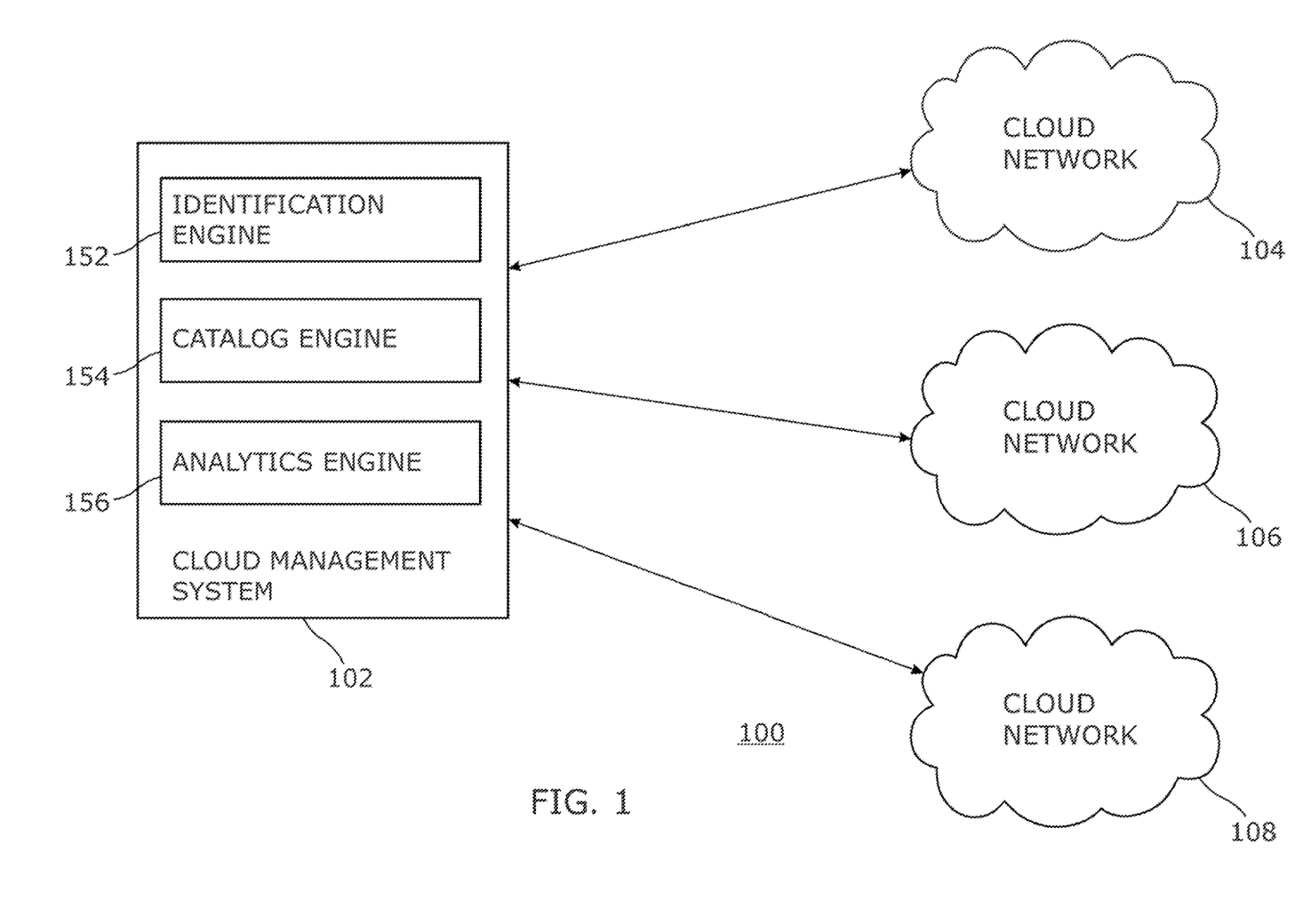
FIG. 1 is a block diagram of an example computing environment for identifying a least cost cloud network for deploying a virtual machine instance.

FIG. 1 is a block diagram of an example computing environment 100 for identifying a least cost cloud network for deploying a virtual machine instance. In an example, computing environment 100 may include a cloud management system 102, and cloud networks (CNs) 104, 106, and 108. Although three cloud networks are shown in FIG. 1, other examples of this disclosure may include more or less number of cloud networks.

In an example, cloud management system 102 may represent any type of computing device capable of reading machine-executable instructions. Examples of the computing device may include, without limitation, a server, a desktop computer, a notebook computer, a tablet computer, a thin client, a mobile device, and the like.

In an example, cloud networks 104, 106, and 108 may each include computing resources, network resources, and/or storage resources. Computing resources may be a hardware computing resource (e.g., includes at least one processor). The hardware computing resource may represent any type of system capable of reading machine-executable instructions. Examples of the hardware computing resource may include a server, a desktop computer, a notebook computer, a tablet computer, a thin client, a mobile device, a personal digital assistant (PDA), and the like. In an example, computing resources may represent software resources (machine-executable instructions). The software resources may include, for example, operating system software, firmware, and application software. Other examples of the software resources may include virtual machines, virtual servers, load balancers, firewalls, etc. In an example, computing resources may be a combination of hardware and software resources.

Network resources may include a network device, a network software, or any combination thereof. Some non-limiting examples of the network device may include a hub, a network switch, a network router, a virtual switch, and a virtual router.

Storage resources may include a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN).

In an example, cloud networks 104, 106, and 108 may each provide or deploy various types of cloud services. These services may include, for example, Infrastructure as a Service (IaaS), Platform as a Service (PaaS), and Software as a Service (SaaS).

In an example, cloud management system 102 may be used to manage resources (e.g., computing resources, network resources, and/or storage resources) on cloud networks 104, 106, and 108. In an example, one or more resources may be used by the cloud management system 102 to provide a cloud service (for example, IaaS) to a user. A user may use cloud management system 102 to request a new cloud service and manage an existing cloud service. Users may also use cloud management system 102 to view a status of a pending cloud service request, pending approvals, and approved service subscriptions.

In an example, cloud networks 104, 106, and 108 may each be a public cloud, a private cloud, or a hybrid cloud. In a public cloud, cloud resources (like servers and storage) may be owned and operated by a third-party cloud service provider and delivered over a network (e.g., the Internet). In a public cloud, cloud resources may be shared with other organizations. On the other hand, in private cloud, cloud resources may be used exclusively by one organization.

In an example, cloud management system 102 may be communicatively coupled with cloud networks 104, 106, and 108, for example, via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, the computer network may be a public network (for example, the Internet) or a private network (for example, an intranet).

In an example, cloud networks 104, 106, and 108 may each include one or multiple virtual machine images. As used herein, a virtual machine image may refer to static data that may contain machine-executable instructions (e.g., an operating system, an application along with configuration and data files, etc.) that a virtual machine may run once started. A virtual machine image may include data that is used to initialize, or create a virtual machine instance. As used herein, a virtual machine instance may refer to a running virtual machine (VM). A virtual machine instance (or "virtual machine") may be started from a virtual machine image, and may execute a program (machine-executable instructions) like a physical machine. A VM may host a guest operating system, which may support one or more applications. Virtualization may allow the creation of one or virtual machines on cloud networks 104, 106, and 108. Virtual machines may be used for a variety of tasks, for example, to run multiple operating systems at the same time, or to test a new application on multiple platforms.

In an example, cloud network 104 may include, for example, virtual machine images: Ubuntu 16.04, Centos_cloudinit, Ubuntu, Red Hat Enterprise Linux (RHEL), Windows, Ubuntu16.04, and Windows 2012; cloud network 106 may include, for example, virtual machine images: Ubuntu-16.04, Windows-2016, Windows-2012, RHEL6, and RHEL7-base; and cloud network 108 may include, for example, virtual machine images: Ubuntu-16-04-server, Centos-7.3-template, Ubuntu-template, Windows-2012-server, and RHEL-x64.

Figure 2:
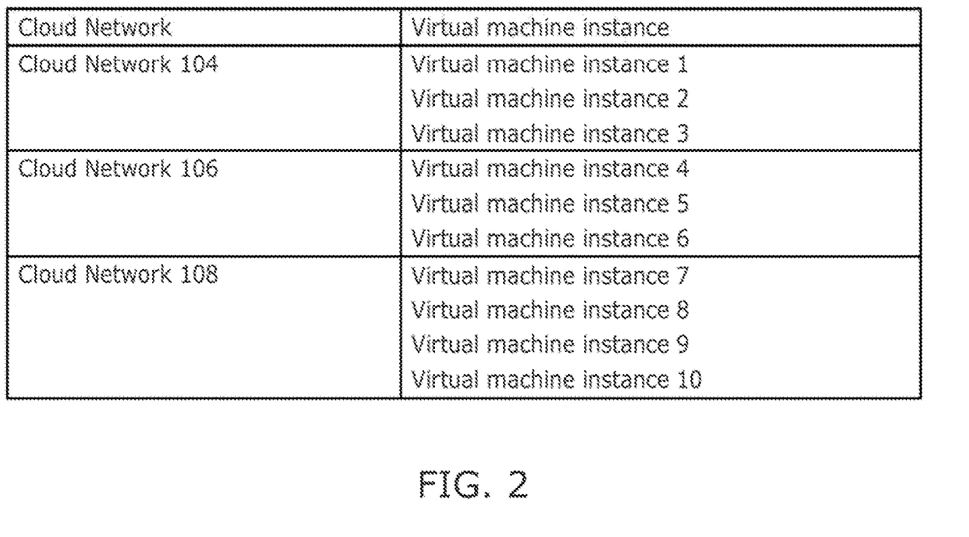
FIG. 2 illustrates an example catalog comprising mapping information.

In an example, cloud networks 104, 106, and 108 may each include one or multiple virtual machine instances based on the virtual machine images available thereon. Referring to FIG. 1, in an example, cloud networks 104, 106, and 108 may include, for example, virtual machine instances 1 to 10, as shown in FIG. 2

In an example, cloud management system 102 may include an identification engine 152, a catalog engine 154, and an analytics engine 156.

Engines 152, 154, and 156 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the cloud management system 102. In some examples, the at least one machine-readable storage medium may store instructions that, when executed by the at least one processing resource, at least partially implement some or all engines of the computing device. In such examples, the cloud management system 102 may include the at least one machine-readable storage medium storing the instructions and the at least one processing resource to execute the instructions. In an example, cloud management system 102 may be any combination of hardware and programming.

In an example, identification engine 152 may identify virtual machine images available across cloud networks 104, 106, and 108. Referring to FIG. 1, in an example, identification engine 152 may identify virtual machine images Ubuntu 16.04, Centos_cloudinit, Ubuntu, Red Hat Enterprise Linux (RHEL), Windows, Ubuntu16.04, and Windows 2012 on cloud network 104; virtual machine images Ubuntu-16.04, Windows-2016, Windows-2012, RHEL6, and RHEL7-base; and virtual machine images Ubuntu-16-04-server, Centos-7.3-template, Ubuntu-template, Windows-2012-server, and RHEL-x64 on cloud 108.

Catalog engine 154 may generate a catalog of the virtual machine images that are identified by identification engine

Figure 3:
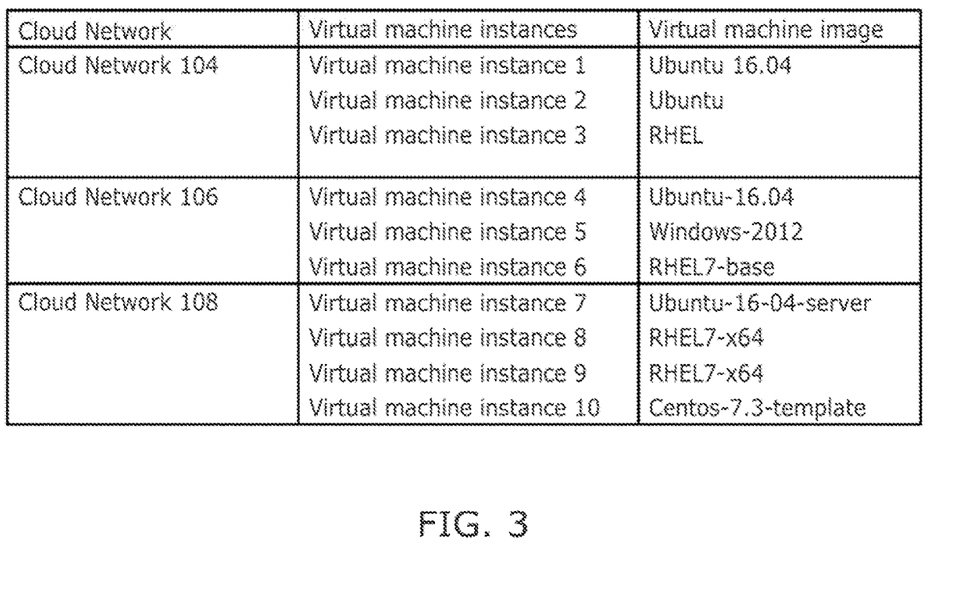
FIG. 3 illustrates an example catalog comprising mapping information.

152. In an example, catalog engine 154 may generate the catalog by identifying virtual machine instances based on the identified virtual machine images. Referring to FIG. 1, in an example, catalog engine 154 may identify virtual machine instances 1 to 10 based on the virtual machine images identified earlier, as shown in FIG. 3.

Catalog engine 154 may create a mapping between a virtual machine instance and a virtual machine image on which the virtual machine image is based.

Figure 4:
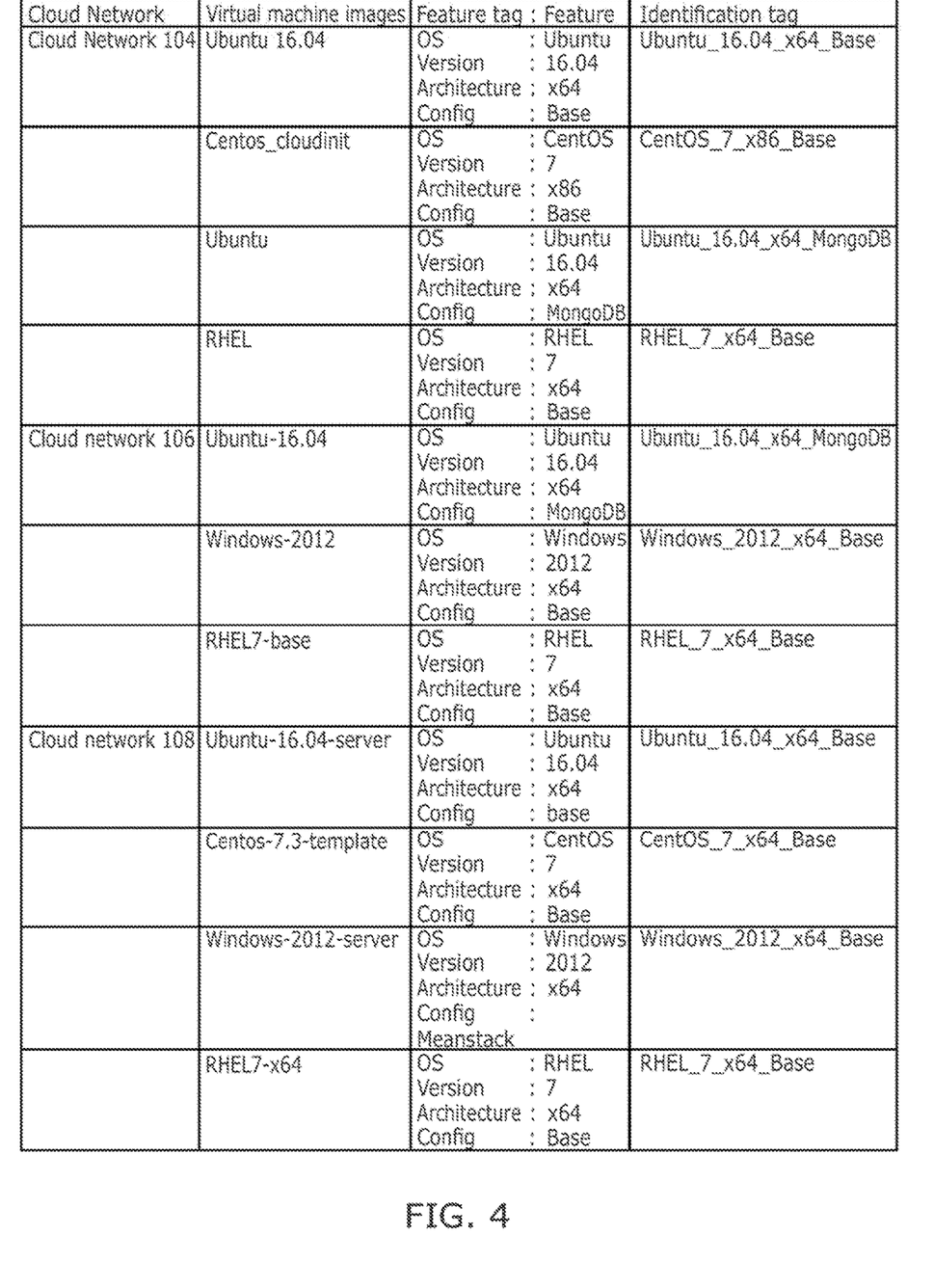
FIG. 4 illustrates an example catalog comprising mapping information.

In an example, a user may assign a feature tag that identifies a feature of a virtual machine image identified by identification engine 152. A user interface (e.g., a Graphical User Interface, a command line interface, etc.) may be provided for a user to provide the feature tag to catalog engine 154, which may associate the feature tag with the virtual machine image. In an example, catalog engine 154 may automatically assign a feature tag that identifies a feature of a virtual machine image. Some non-limiting examples of a feature identified with a virtual machine image may include: an operating system of the virtual machine image, a version of the operating system of the virtual machine image, an architecture of the operating system of the virtual machine image, and a configuration of the operating system of the virtual machine image. Referring to FIG. 1, in an example, following feature tags may be assigned to various features of the virtual machine images identified earlier, as shown in FIG. 4.

In an example, catalog engine 154 may automatically assign an identification tag to a virtual machine image identified by identification engine 152. An identification tag, as used herein, may refer to a unique tag that is used to represent a unique set of features of a virtual machine image. Referring to FIG. 4, in an example, identification tag Ubuntu_16.04_x64_Base may be selected to represent features "Ubuntu", "16.04", "x64", and "Base" of virtual machine image Ubuntu 16.04. To provide another example, identification tag CentOS_7_x86_Base may be used to represent features "CentOS", "7", "x86", and "Base" of virtual machine image Centos_cloudinit. Likewise, features of other virtual machine images in cloud networks 104, 106, and 108 may each be assigned an identification tag.

In the event, if a feature (or a set of features) is common across multiple virtual machine images, catalog engine 154 may assign a common identification tag to those virtual machine images. For example, referring to FIG. 4, identification tag Ubuntu_16.04_x64_Base may be assigned to both virtual machine images Ubuntu 16.04 and Ubuntu16.04 since both of them share common features i.e. "Ubuntu", "16.04", "x64", and "Base".

In an example, a user may assign an identification tag to a virtual machine image.

Figure 5:
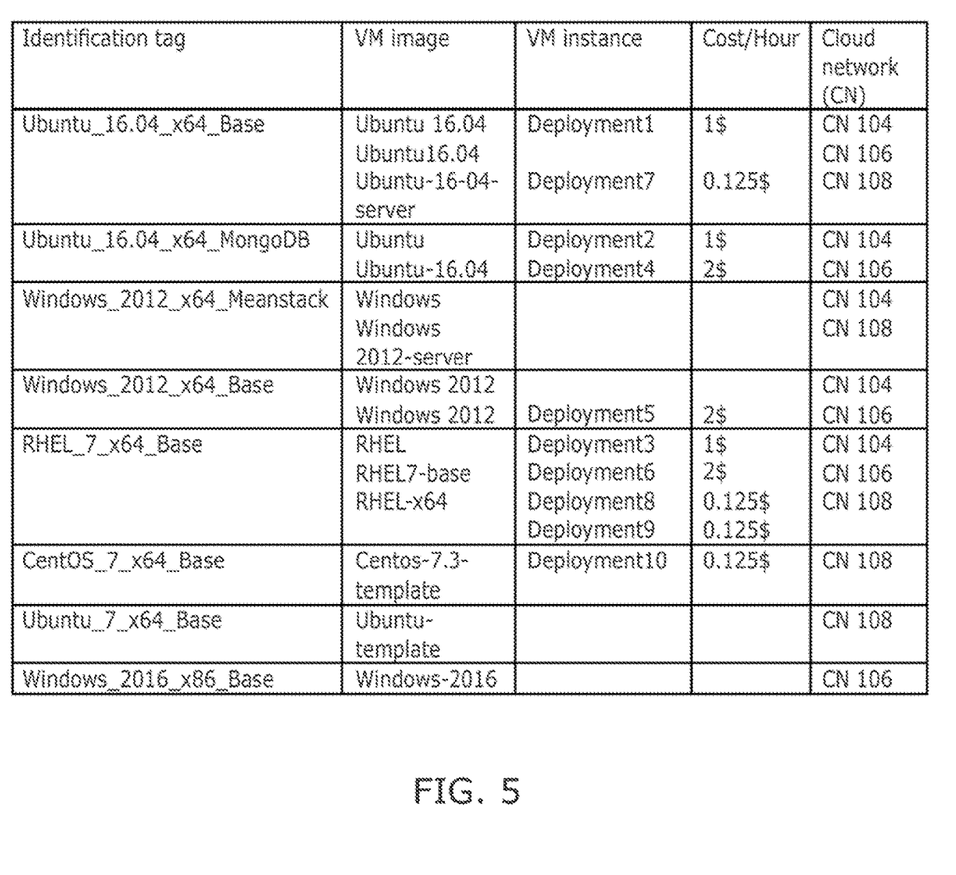
FIG. 5 illustrates an example catalog comprising mapping information.

Catalog engine 154 may determine the cost of deploying a virtual machine instance on a cloud network. As described earlier, catalog engine 154 may identify a virtual machine instance based on a virtual machine image on a cloud network. For example, FIG. 3 illustrates virtual machine instances 1, 2 and 3 based on virtual machine images Ubuntu 16.04, Ubuntu, and RHEL respectively, on cloud network 104. In an example, catalog engine 154 may determine the cost (for example, per hour) of deploying each of these virtual machine instances on cloud network 104. Likewise, catalog engine 154 may determine the cost of deploying a virtual machine instances on other cloud networks such 106 and 108. This is illustrated in FIG. 5. Catalog engine 154 may save the cost of deploying a virtual machine instance on cloud management platform 102.

Catalog engine 154 may create mapping information for a virtual machine image. In an example, the mapping information may comprise a mapping of the name of a virtual machine image, the name of the virtual machine instance based on the virtual machine image, the name of the cloud network providing the virtual machine image, the cost of deploying the virtual machine instance on the cloud network, the feature tag identifying a feature of the virtual machine image, and the identification tag assigned to the virtual machine image. Catalog engine 154 may store the mapping information in the catalog on cloud management platform 102.

In an example, for a given virtual machine instance, analytics engine 156 may be used to analyze the catalog of the virtual machine images to identify a least cost cloud network that provides a least cost of deploying the virtual machine instance based on a virtual machine image available thereon. In an example, analytics engine 156 may analyze when the virtual machine instance is created by a user, for example, based on an existing virtual machine image on an existing cloud network. Since the catalog created by catalog engine 154 may include costs of deploying a virtual machine instance for various individual cloud networks, if a user wants to deploy a given virtual machine instance, analytics engine 156 may analyze the catalog of the virtual machine images to identify a least cost cloud network that provides the least cost of deploying the virtual machine instance. In an example, analytics engine 156 may generate a report identifying a least cost cloud network that provides the least cost of deploying the virtual machine instance. Once the least cost cloud network has been identified, analytics engine 156 may recommend movement of a virtual machine image from its current cloud network to the least cost cloud network.

Referring to FIG. 5, to provide an example, for virtual machine instance 1, analytics engine 156 may recommend moving virtual machine instance 1 on cloud network 1 to the least cost cloud network 3 where a similar virtual machine image for generation of the virtual machine instance is present. To provide another example, analytics engine 156 may recommend moving virtual machine instance 4 on cloud network 2 to the least cost cloud network 1 where a similar virtual machine image for generation of the virtual machine instance is present. To provide another example, analytics engine 156 may recommend moving virtual machine instance 3 on cloud network 1 to the least cost cloud network 3 where a similar virtual machine image for generation of the virtual machine instance is present.

In an example, a new cloud network comprising a new virtual machine may be added to the existing cloud networks. In such scenario, in response to the inclusion, catalog engine 154 may update the catalog of virtual machine images to include a mapping information related to the new virtual machine. The mapping information may comprise: a name of the new virtual machine image, a name of a virtual machine instance based on the new virtual machine image, a name of the new cloud network providing the new virtual machine image, a cost of deploying the virtual machine instance on the new cloud network, a feature tag identifying a feature of the new virtual machine image, and an identification tag assigned to the new virtual machine image.

In an example, if the feature of the new virtual machine image is common with the feature of an existing virtual machine image, catalog engine 154 may assign the identification tag of the existing virtual machine image as the identification tag of the new virtual machine image.

In response to inclusion of the mapping information related to the new virtual machine in the catalog, analytics engine 156 may re-analyze the catalog to identify the least cost cloud network that provides the least cost of deploying the virtual machine instance, considering the mapping information related to the new virtual machine in the new cloud network.

In an example, a new virtual machine may be added to an existing cloud network. In such scenario, catalog engine 154 may update the catalog of virtual machine images to include a mapping information related to the new virtual machine. The mapping information may comprise: a name of the new virtual machine image, a name of a virtual machine instance based on the new virtual machine image, a name of the existing cloud network providing the new virtual machine image, a cost of deploying the virtual machine instance on the existing cloud network, a feature tag assigned to the new virtual machine image, and an identification tag assigned to the new virtual machine image.

In an example, if the feature of the new virtual machine image is common with the feature of an existing virtual machine image, catalog engine 154 may assign the identification tag of the existing virtual machine image as the identification tag of the new virtual machine image.

In response to inclusion of the mapping information related to the new virtual machine in the catalog, analytics engine 156 may re-analyze the catalog to identify the least cost cloud network that provides the least cost of deploying the virtual machine instance, considering the mapping information related to the new virtual machine in the existing cloud network.

Figure 6:
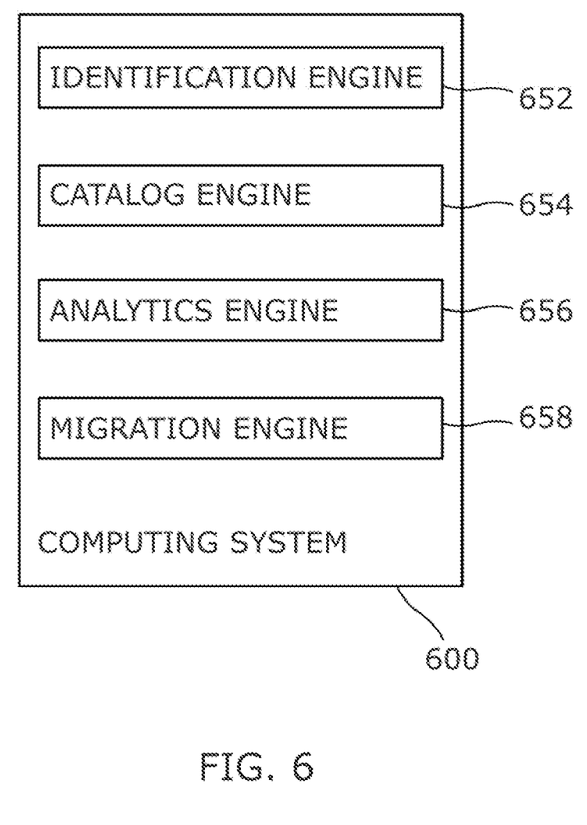
FIG. 6 is a block diagram of an example computing system for identifying a least cost cloud network for deploying a virtual machine instance.

FIG. 6 is a block diagram of an example computing system 600 for identifying a least cost cloud network for deploying a virtual machine instance. In an example, computing system 600 may be analogous to the cloud management system 102 of FIG. 1, in which like reference numerals correspond to the same or similar, though perhaps not identical, components. For the sake of brevity, components or reference numerals of FIG. 6 having a same or similarly described function in FIG. 1 are not being described in connection with FIG. 6. Said components or reference numerals may be considered alike.

In an example, computing system 600 may represent any type of computing device capable of reading machine-executable instructions. Examples of computing device may include, without limitation, a server, a desktop computer, a notebook computer, a tablet computer, a thin client, a mobile device, and the like.

In an example, computing system 600 may include an identification engine 652, a catalog engine 654, an analytics engine 656, and a migration engine 658. Identification engine 152, catalog engine 154, and analytics engine 156 may perform functionalities similar to those described earlier in reference to identification engine 152, catalog engine 154, and analytics engine 156, respectively.

In an example, an identification engine 652 may identify virtual machine images available across a plurality of cloud networks. Catalog engine 654 may generate a catalog of the virtual machine images. The catalog may comprise, for each virtual machine image, a mapping information. The mapping information may comprise: a name of a virtual machine image, a name of a virtual machine instance based on the virtual machine image, a name of a cloud network providing the virtual machine image, a cost of deploying the virtual machine instance on the cloud network, a feature tag identifying a feature of the virtual machine image, and an identification tag assigned to the virtual machine image.

In an example, for a given virtual machine instance, analytics engine 656 may analyze the catalog of the virtual machine images to identify a least cost cloud network in the plurality of cloud networks that provides a least cost of deploying the virtual machine instance based on a virtual machine image available thereon. Migration engine 658 may migrate the virtual machine instance to the least cost cloud network.

Figure 7:
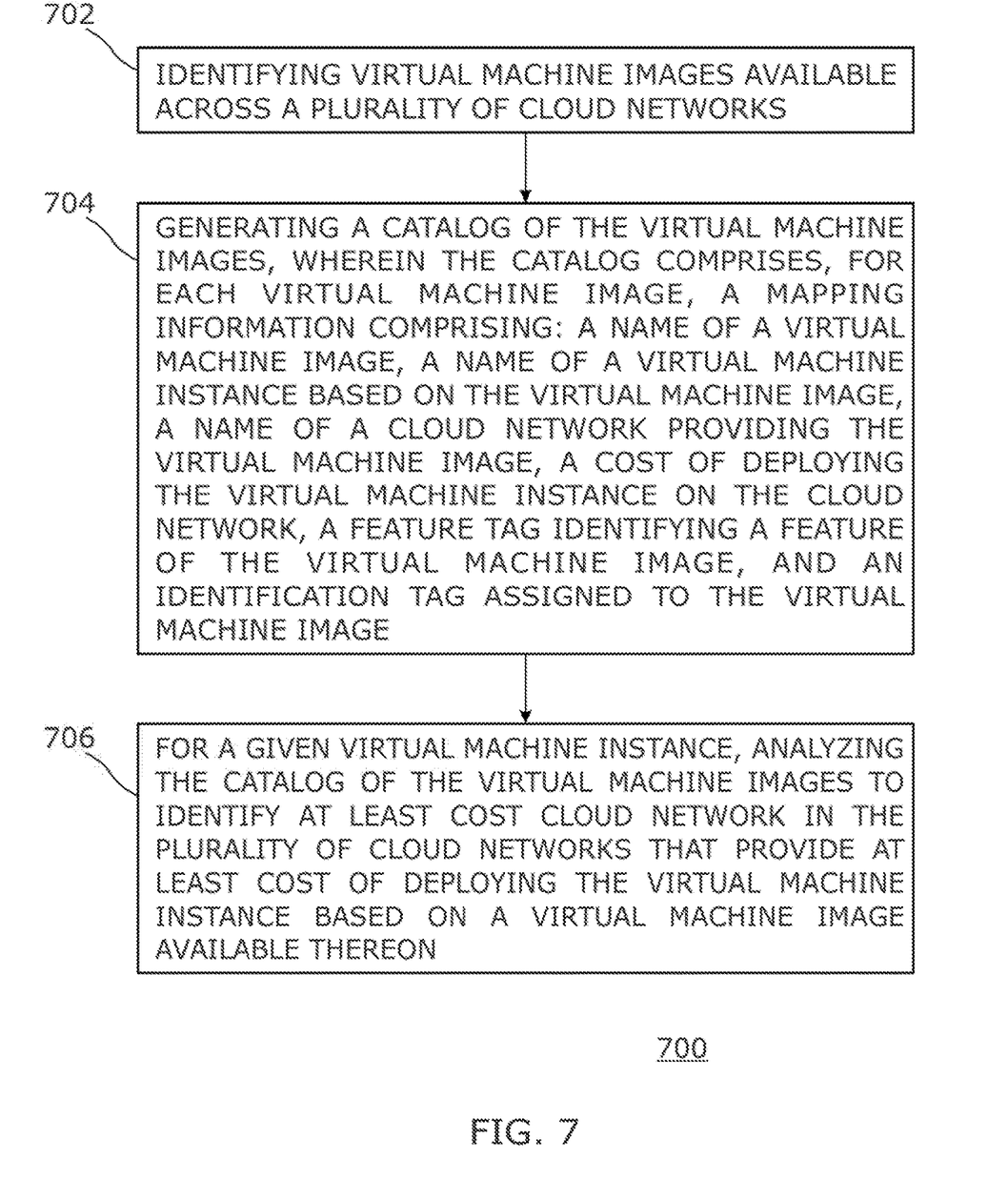
FIG. 7 is a flowchart of an example method of identifying a least cost cloud network for deploying a virtual machine instance.

FIG. 7 is a flowchart of an example method 700 of identifying a least cost cloud network for deploying a virtual machine instance. The method 700, which is described below, may be executed on a computing device such as cloud management platform 102 of FIG. 1 or computing system 600 of FIG. 6. However, other computing devices may be used as well. At block 702, virtual machine images available across a plurality of cloud networks may be identified. At block 704, in response to the identification, a catalog of the virtual machine images may be generated. In an example, the catalog may comprise, for each virtual machine image, a mapping information. In an example, the mapping information may comprise: a name of a virtual machine image, a name of a virtual machine instance based on the virtual machine image, a name of a cloud network providing the virtual machine image, a cost of deploying the virtual machine instance on the cloud network, a tag identifying a feature of the virtual machine image, and an identification tag assigned to the virtual machine image. At block 706, for a given virtual machine instance, the catalog of the virtual machine images may be analyzed to identify a least cost cloud network that provides a least cost of deploying the virtual machine instance based on a virtual machine image available thereon.

Figure 8:
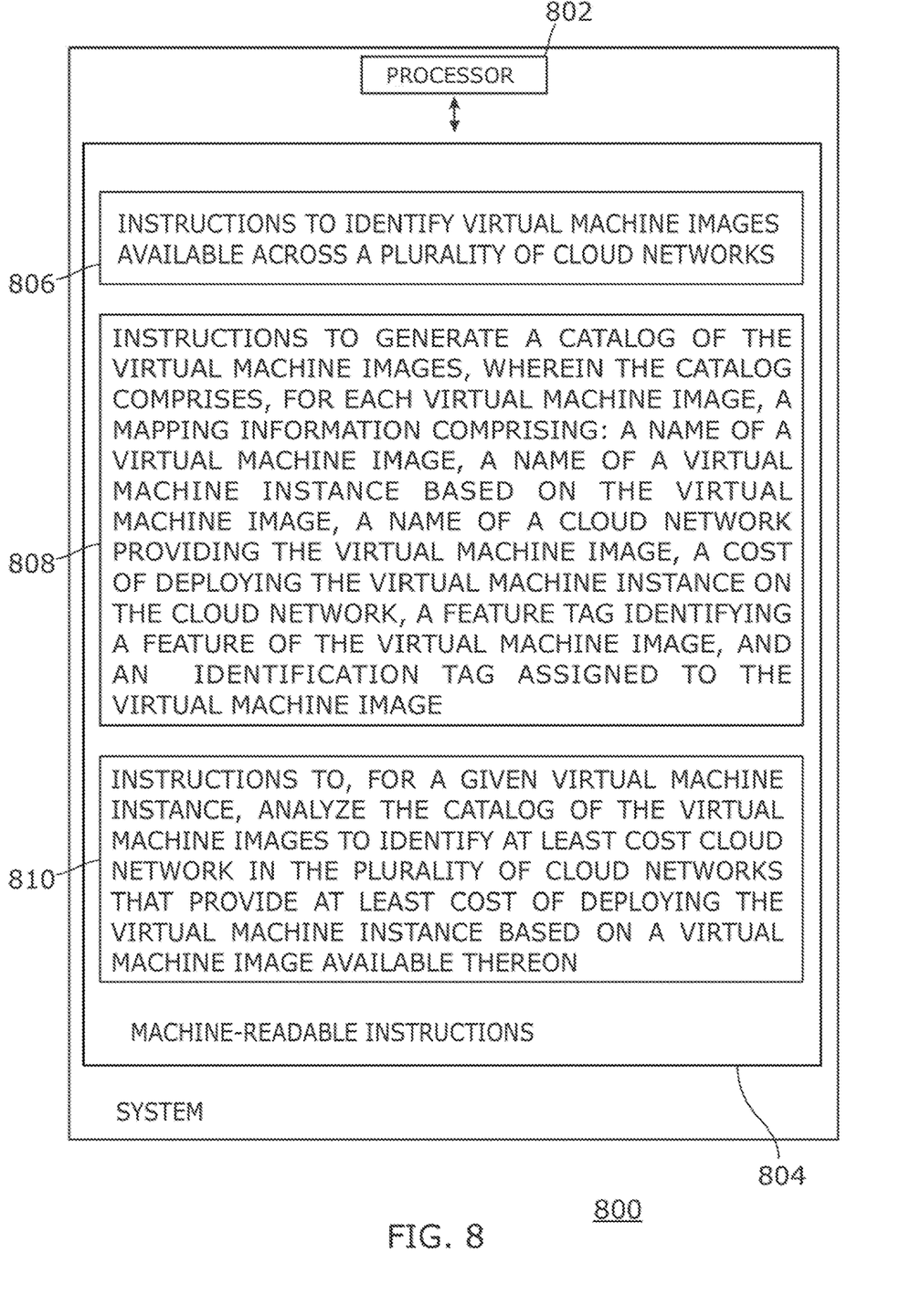
FIG. 8 is a block diagram of an example system including instructions in a machine-readable storage medium for identifying a least cost cloud network for deploying a virtual machine instance.

FIG. 8 is a block diagram of an example system 800 including instructions in a machine-readable storage medium for identifying a least cost cloud network for deploying a virtual machine instance. System 800 includes a processor 802 and a machine-readable storage medium 804 communicatively coupled through a system bus. In some examples, system 800 may be analogous to a cloud management platform 102 of FIG. 1 or computing system 600 of FIG. 6. Processor 802 may be any type of Central Processing Unit (CPU), microprocessor, or processing logic that interprets and executes machine-readable instructions stored in machine-readable storage medium 804. Machine-readable storage medium 804 may be a random access memory (RAM) or another type of dynamic storage device that may store information and machine-readable instructions that may be executed by processor 802. For example, machine-readable storage medium 804 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 804 may store instructions 806, 808, and 810.

In an example, instructions 806 may be executed by processor 802 to identify virtual machine images available across a plurality of cloud networks. Instructions 808 may be executed by processor 802 to generate a catalog of the virtual machine images. In an example, the catalog may comprise, for each virtual machine image, a mapping information. In an example, the mapping information may comprise: a name of a virtual machine image, a name of a virtual machine instance based on the virtual machine image, a name of a cloud network providing the virtual machine image, a cost of deploying the virtual machine instance on the cloud network, a tag identifying a feature of the virtual machine image, and an identification tag assigned to the virtual machine image. instructions 810 may be executed by processor 802 to analyze, for a given virtual machine instance, the catalog of the virtual machine images to identify a least cost cloud network that provides a least cost of deploying the virtual machine instance based on a virtual machine image available thereon.

For the purpose of simplicity of explanation, the example method of FIG. 6 is shown as executing serially, however it is to be understood and appreciated that the present and other examples are not limited by the illustrated order. The example systems of FIGS. 1, 5, 6, and 8, and method of FIG. 7 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method, comprising:
   identifying virtual machine images available across a plurality of cloud networks;
   generating a catalog of the virtual machine images, wherein the catalog comprises, for each virtual machine image, a mapping information comprising: a name of a virtual machine image, a name of a virtual machine instance based on the virtual machine image, a name of a cloud network providing the virtual machine image, a cost of deploying the virtual machine instance on the cloud network, a feature tag identifying a feature of the virtual machine image, and an identification tag assigned to the virtual machine image; and
   for a given virtual machine instance, analyzing the catalog of the virtual machine images to identify a least cost cloud network in the plurality of cloud networks that provides a least cost of deploying the virtual machine instance based on a virtual machine image available thereon.

2. The method of claim 1, wherein generating the catalog of the virtual machine images comprises:
   identifying a virtual machine instance based on the virtual machine image;
   assigning the feature tag that identifies the feature of the virtual machine image; assigning the identification tag to the virtual machine image;
   determining the cost of deploying the virtual machine instance on the cloud network;
   mapping the name of a virtual machine image, the name of the virtual machine instance based on the virtual machine image, the name of the cloud network providing the virtual machine image, the cost of deploying the virtual machine instance on the cloud network, the feature tag identifying a feature of the virtual machine image, and the identification tag assigned to the virtual machine image; and
   storing the mapping as the mapping information in the catalog of the virtual machine images.

3. The method of claim 1, wherein assigning comprises:
   assigning a common identification tag to a plurality of virtual machine images if the feature of the virtual machine image is common across the plurality of virtual machine images.

4. The method of claim 1, further comprising:
   in response to an inclusion of a new cloud network comprising a new virtual machine to the plurality of cloud networks, updating the catalog of virtual machine images to include a mapping information related to the new virtual machine, comprising: a name of the new virtual machine image, a name of a virtual machine instance based on the new virtual machine image, a name of the new cloud network providing the new virtual machine image, a cost of deploying the virtual machine instance on the new cloud network, a new feature tag identifying a feature of the new virtual machine image, and an identification tag assigned to the new virtual machine image.

5. The method of claim 4, wherein if the feature of the new virtual machine image is common with the feature of the virtual machine image, assigning the identification tag of the virtual machine image as the identification tag of the new virtual machine image.

6. The method of claim 4, further comprising:
   re-analyzing the catalog to identify the least cost cloud network that provides the least cost of deploying the virtual machine instance, considering the mapping information related to the new virtual machine in the new cloud network.

7. The method of claim 1, further comprising:
   in response to an inclusion of a new virtual machine to an existing cloud network in the plurality of cloud networks, updating the catalog of virtual machine images to include a mapping information related to the new virtual machine, comprising: a name of the new virtual machine image, a name of a virtual machine instance based on the new virtual machine image, a name of the existing cloud network providing the new virtual machine image, a cost of deploying the virtual machine instance on the existing cloud network, and a new tag assigned to the new virtual machine image.

8. The method of claim 7, further comprising:
   re-analyzing the catalog to identify the least cost cloud network that provides the least cost of deploying the virtual machine instance, considering the mapping information related to the new virtual machine in the existing cloud network.

9. The method of claim 7, wherein if the feature of the new virtual machine image is common with the feature of the virtual machine image, assigning the identification tag of the virtual machine image as the identification tag of the new virtual machine image.

10. The method of claim 1, wherein analyzing occurs in response to creation of the given virtual machine instance by a user.

11. A system, comprising:
a machine-readable medium storing executable instructions; and
a processor operatively coupled to the machine-readable medium, wherein the processor executes the instructions to:
an identify virtual machine images available across a plurality of cloud networks;
generate a catalog of the virtual machine images, wherein the catalog comprises, for each virtual machine image, a mapping information comprising: a name of a virtual machine image, a name of a virtual machine instance based on the virtual machine image, a name of a cloud network providing the virtual machine image, a cost of deploying the virtual machine instance on the cloud network, a feature tag identifying a feature of the virtual machine image, and an identification tag assigned to the virtual machine image; and
for a given virtual machine instance, analyze the catalog of the virtual machine images to identify a least cost cloud network in the plurality of cloud networks that provides a least cost of deploying the virtual machine instance based on a virtual machine image available thereon.

12. The system of claim 11, wherein the processor executes the instructions to:
migrate the virtual machine instance to the least cost cloud network.

13. The system of claim 11, wherein the feature tag identifying the feature of the virtual machine image is provided by a user.

14. The system of claim 11, wherein the given virtual machine instance is created based on an existing virtual machine image.

15. The system of claim 11, wherein the given virtual machine instance is created on an existing cloud network.

16. A non-transitory machine-readable storage medium comprising instructions, the instructions executable by a processor to:
identify virtual machine images available across a plurality of cloud networks;
generate a catalog of the virtual machine images, wherein the catalog comprises, for each virtual machine image, a mapping information comprising: a name of a virtual machine image, a name of a virtual machine instance based on the virtual machine image, a name of a cloud network providing the virtual machine image, a cost of deploying the virtual machine instance on the cloud network, a feature tag identifying a feature of the virtual machine image, and an identification tag assigned to the virtual machine image; and
analyze, for a given virtual machine instance, the catalog of the virtual machine images to identify a least cost cloud network in the plurality of cloud networks that provides a least cost of deploying the virtual machine instance based on a virtual machine image available thereon.

17. The storage medium of claim 16, wherein the plurality of cloud networks include at least one of a private cloud network and a public cloud network.

18. The storage medium of claim 16, wherein the feature of the virtual machine image includes one of an operating system of the virtual machine image, a version of the operating system of the virtual machine image, an architecture of the operating system of the virtual machine image, and a configuration of the operating system of the virtual machine image.

19. The storage medium of claim 16, further comprising instructions to generate a report identifying the least cost cloud network available for deploying the virtual machine instance.

20. The storage medium of claim 16, further comprising instructions to migrate the virtual machine instance to the least cost cloud network, in response to a selection made by a user.

* * * * *